DETACHABLE SLIP SINKER AND DROP-OFF SINKER

Filed July 8, 1968 3 Sheets-Sheet 1

FIG. 5-A

Hugh W. MacLeod and
Gardner J. MacLeod,
Inventors
by
Lyle G. Trorey,
Agent

DETACHABLE SLIP SINKER AND DROP-OFF SINKER

Filed July 8, 1968 3 Sheets-Sheet 2

Hugh W. MacLeod and
Gardner J. MacLeod,
Inventors
by
Lyle G. Trorey,
Agent

DETACHABLE SLIP SINKER AND DROP-OFF SINKER

Filed July 8, 1968 3 Sheets-Sheet 3

Hugh W. MacLeod and
Gardner J. MacLeod,
Inventors by

Lyle G. Trorey,
Agent

United States Patent Office 3,516,192

Patented June 23, 1970

3,516,192

DETACHABLE SLIP SINKER AND DROP-OFF SINKER

Hugh W. MacLeod, 2244 E. Pender St., and Gardner J. MacLeod, 2741 Venables St., both of Vancouver 6, British Columbia, Canada Filed July 8, 1968, Ser. No. 743,166
Int. Cl. A01k 95/00
U.S. Cl. 43—43.12 9 Claims

ABSTRACT OF THE DISCLOSURE

A slip and/or drop-off sinker with spaced rings has a fishing line passing through the rings with a slip knot in the line adjacent to one of the rings for releasably securing the sinker to the line. The knot is released by a fish pulling on the line so that the sinker either drops off or slips down the line according to how the line is associated with the sinker rings.

FIELD OF THE INVENTION

The invention relates to a fishing sinker, for instance for salmon trolling, the sinker being adapted for attachment to a fishing line at a desired distance from a hook end of the line, being constructed and arranged so that, when a fish strikes, the sinker will be released either to drop off the line or to slide downwardly along the line. Sinkers sliding as aforesaid are known as "slip" sinkers.

Thus the sinker is releasably secured to the line adapted either to drop off, or to slide downwardly along the line, when a fish strikes. Whether the sinker slides or drops off depends upon a particular securing means used, as later described in detail.

U.S. Pat. 2,957,267 issued in 1960 to Dempsey describes a simple and ingenious sinker constructed and arranged to slide down the line. This invention provides a slip sinker that can be easily and readily applied to, and secured on, a line at a desired distance from the lure, and which will retain its position thereon under normal trolling conditions but which can be automatically released, to allow it to slide on the line to the lure by reeling in the line after the sinker has been engaged with an eye at the end of a fishing pole.

U.S. Pat. 2,562,054 issued to Mathieu in 1951 differs from the Dempsey sinker above in that Mathieu teaches structures adapted to release the sinker from the line when a fish strikes. This device includes a spring-loaded pin securing a sinker weight, the spring being released by the strike of the fish so that the weight drops off the line. This is a drop-off sinker.

Snapps' fishing sinker, U.S. Pat. 2,592,967 issued in 1952, teaches a sinker which can be adjustably anchored to the fishing line at a desired distance above a leader swivel in such a manner as to permit it to be released when a fish strikes, so that the sinker will thereafter slide downwardly along the line so that the line can substantially be reeled in before the sinker reaches the reel tip. This is a slip sinker.

An earlier slip sinker is described in U.S. Pat. 2,399,298 issued to Sevegny in 1946. This is a simple and effective device providing a sinker readily adjusted to any position on a fishing line, to remain in that position until such time as a fish strikes. A pull exerted by the strike releases the line from a detent of the sinker, so that the sinker slides down the line as before.

Both slip sinkers and drop-off sinkers have advantages and disadvantages which are recognized.

The present invention distinguishes over the above, and over other art as known to the present inventors, in that it provides one sinker structure which, according to the attachment means used, is capable of operating either as a slip sinker, or as a drop-off sinker, and moreover has structural and functional differences from the said art, being characterized by simplicity.

OUTLINE OF THE INVENTION

Hereinafter "releasably secured," and like terms are used to mean (according to context) securing the sinker at a desired position on the line subsequently to release either to drop off or slide as aforesaid.

A central concept of the present invention is a fishing sinker adapted to be releasably secured to a fishing line extending from an end secured, for instance, to a reel of a rod, or otherwise secured (hereinafter referred to as a fixed end of the line) to the hook end. Release of the sinker from the line is effected by tension arising in a part of the line extending from the hook to the sinker, the said tension resulting from the strike of a fish. The sinker assembly includes; a weight element; at least two openings coacting with the weight element and being adapted for passage of the line therethrough; the openings also being adapted for a knot means in cooperative engagement therewith releasably to secure the weight to the line, the knot being constructed and arranged to be released by tension as aforesaid—so that the sinker either slides down the line, or drops off, according to the kind of knot used.

The detailed description following is related to the drawings, and describes a preferred embodiment of the invention which, however, is capable of expression in structure other than that described and illustrated.

PREFERRED EMBODIMENT

Figure 1:
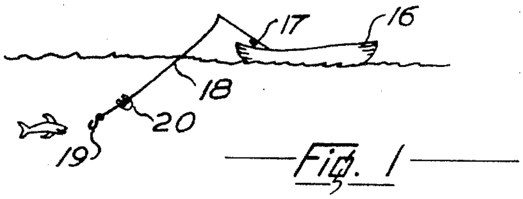
FIG. 1 shows a sinker in use.

Description of FIG. 1

A fisherman (not shown) in a boat 16 holds a rod and reel 17, a line 18 extending continuously to a hook 19. The rod and reel end is referred to hereinafter and in the claims as the "fixed" end of the line, and, as is well understood by those skilled in the art, the line can be fixed by means other than a rod and reel. A sinker assembly according to one embodiment of the invention is shown releasably secured to the line designated generally 20.

Figure 2:
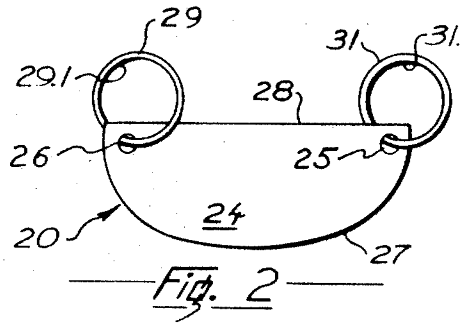
FIG. 2 is a side elevation of a split-ring configuration of the sinker.
Figure 3:
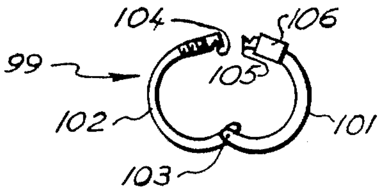
FIG. 3 is a perspective of a split-ring.
Figure 3:

Description of FIGS. 2–3

The assembly 20 has a weight element 24, having spaced holes 25 and 26 adjacent top corners thereof as shown. The weight element 24, of suitable sheet material known in the art, has a periphery defined by a curved side edge 27 and a chord or top edge 28, the said holes being spaced from the corners leaving a suitable edge margin as shown. Two split rings 29 and 31 which can be the same size are secured in the holes 25 and 26 of the weight element. Note that FIG. 3 is a perspective of the ring 29, which ring is obviously secured to the sinker by introducing an appropriate edge of the sinker 24 into a gap produced by an end 29.1 and rotating the ring once. The ring 31 is similarly secured in the hole 25 by inserting the sinker edge into a gap produced by an end 31.1.

Tying the knot of the slip sinker embodiment FIGS. 6 through 12

Figure 6:
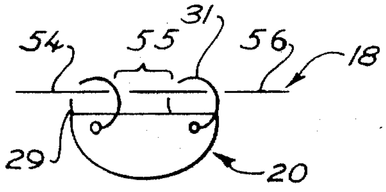
FIGS. 6–11 are sequence diagrams showing a method of tying a knot used in a slip sinker embodiment.
Figure 7:
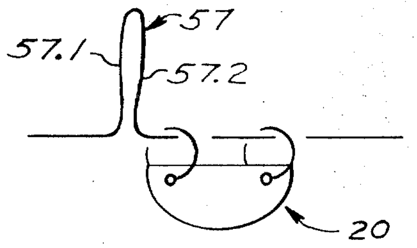

Tying a knot as used with the FIG. 2 configuration is now described with reference to the figures above. The line 18 is threaded through both rings 29 and 31 as shown in FIG. 6 in a manner similar to the securing of the ring to the sinker. For convenience of reference the continuous line 18 is described in three parts as follows: On the hook side of ring 29 the line is designated 54, between the rings 29 and 31 the line is designated 55, and on the reel side of the ring 31 the line is designated 56.

Figure 8:
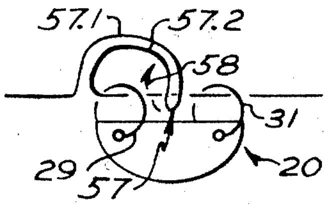
Figure 9:
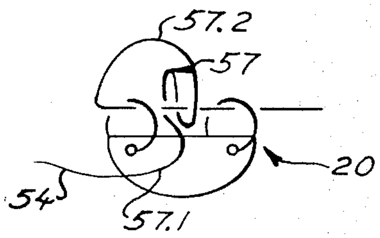
Figure 10:
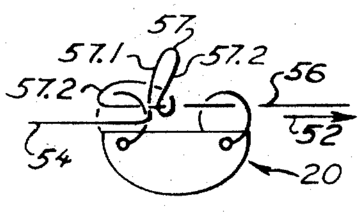
Figure 11:
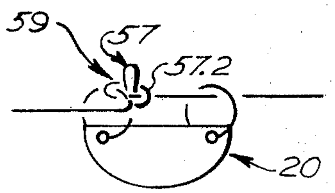
Figure 12:
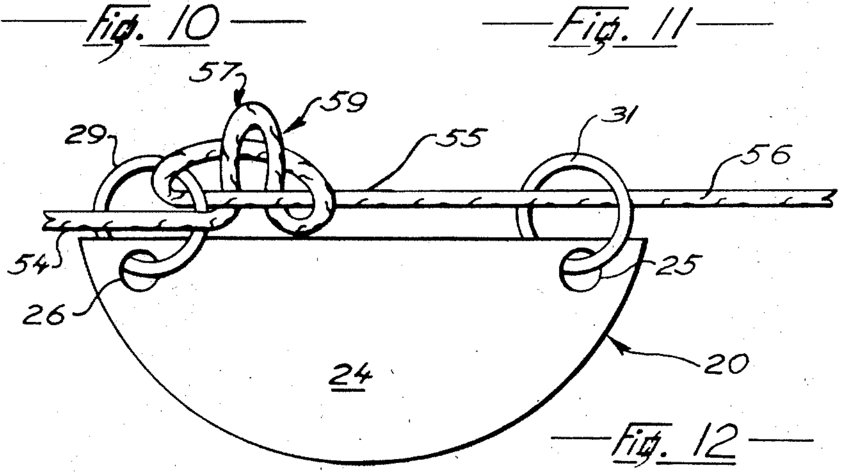
FIG. 12 is the slip sinker embodiment of the invention.

A first loop 57 is made in the hook side part 54, having two sides 57.1 and 57.2 (FIG. 7), and this loop is taken back past the ring 29 and brought across the line part 55, between the two rings, as shown in FIG. 8. The loop 57 is then taken under the line part 55 and pushed upwards as shown by an arrow 58, at the same time allowing the half loop 57.1 to fall away, as seen in FIG. 9. The loop 57 is then pulled gently, ensuring that it is threaded through its half 57.2, as shown in FIG. 9. The line part 56 is then pulled gently in the direction of the reel, shown by arrow 52 (FIG. 10) while holding the loop 57 and the sinker. After further tightening, a knot means 59 having a shape as shown in FIG. 11 is formed. FIG. 12 shows the knot formation at larger scale before final tightening. In this condition, the knot is in cooperative engagement with a ring opening. On the strike of a fish, a tension in the part 54 of the line results in the loop 57 being pulled out; the sinker is thus released and slides freely downwards along the line 18. Clearly, there is an opposite reaction to this tension in the part 56 of the line.

Tying the knot of the drop-off sinker embodiment FIGS. 13 through 19

Tying a knot as used with the FIG. 2 configuration is now described with reference to sequence diagrams above.

Figure 13:
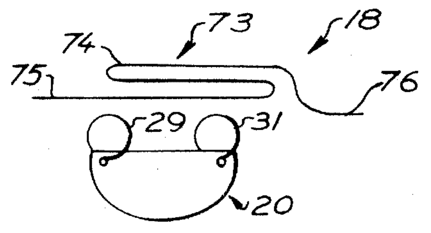
FIGS. 13–18 are sequence diagrams showing a method of tying a knot as used in a drop-off sinker embodiment.
Figure 14:
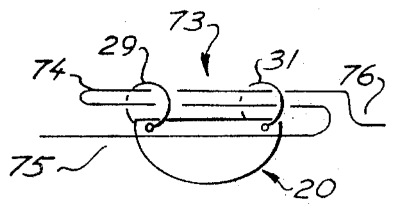
Figure 15:
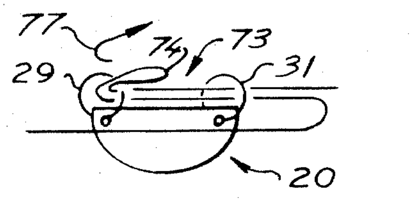
Figure 16:
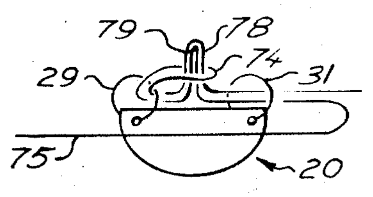
Figure 17:
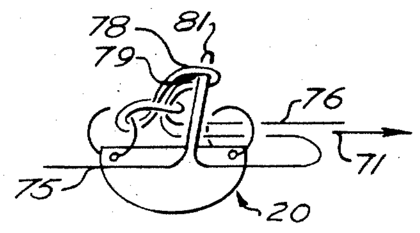
Figure 18:
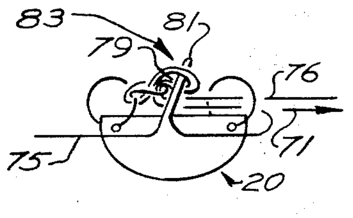
Figure 19:
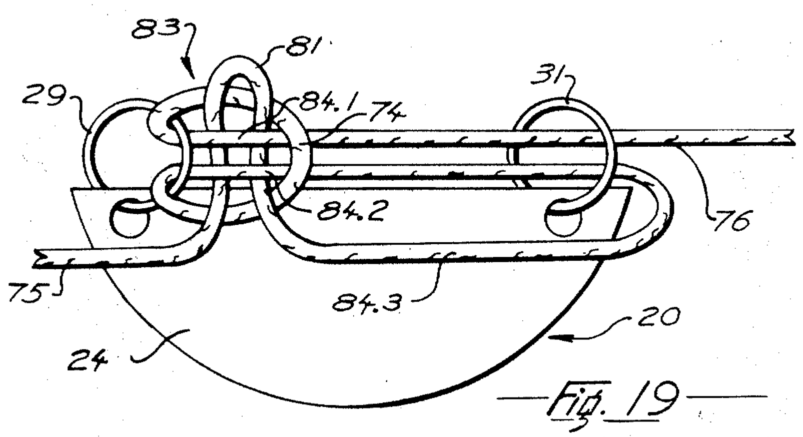
FIG. 19 shows the invention in the drop-off sinker embodiment.

The line 18 is formed into a first loop 73, having an apex 74, as shown in FIG. 13. For convenience of reference the line is divided into three parts as follows: the aforementioned loop 73, a part of line on the hook side of the loop, 75, and a part of line on the reel side of the loop, 76, the several parts being continuous. The loop apex 74 is threaded through rings 29 and 31 as shown in FIG. 14, and is then pulled back on the ring 29 in a direction shown by an arrow 77, FIG. 15. A portion of the loop 73 lying between the rings 29 and 31 is pulled up into a double loop 78, which is threaded through the apex 74 of the first loop, FIG. 16. As best seen in FIG. 17, this produces an "eye" 79, formed by the loop 78 and a constricting action of the apex 74. This eye is suitably held to prevent distortion, while a third loop 81 is formed in the part 75. This third loop is threaded through the eye 79, as shown in FIG. 17 and, on releasing the eye 79 and holding the loop 81, the line 76 is pulled gently in a direction shown by an arrow 71, partially tightening a knot means 83 so formed, as seen in FIG. 18. Before a final tightening of the knot 83, the drop-off sinker embodiment of the invention appears as in FIG. 19. In this condition, the knot is in cooperative engagement with a ring opening. It can be seen that the eye 79 has been straightened into two parallel lengths, 84.1 and 84.2 and that the length 84.2, after passing through ring 31, is designated 84.3 for its length between knot 83 and ring 31. On the strike of a fish, tension in the line straightens out the loop 81 by pulling it under the parallel lengths aforesaid. This allows the line to run freely through the rings, the knot substantially straightening out and releasing the sinker from the line.

Figure 4:
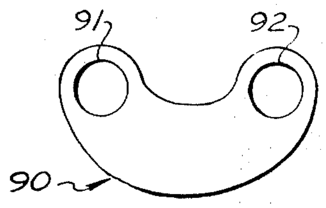
FIG. 4 is a side elevation of an integral ring configuration.
Figure 5:
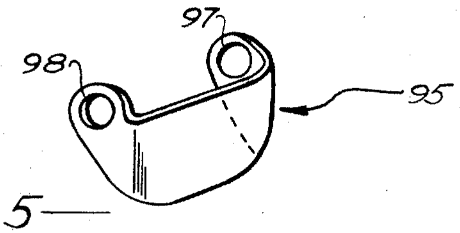
FIG. 5 is a perspective view of an alternate integral ring sinker configuration, FIG. 5–A is a plan view of a reinforced hinged ring.

Alternative configurations FIGS. 4 through 5–A

FIG. 4 shows a sinker 90, having spaced openings 91, 92, which are effectively intergral rings located near its extremities as shown; similarity to the FIG. 2 embodiment is apparent. The size and spacing of the openings is not critical, but is sufficient to allow free running of the line. If the sinker 90 is used in the slip-sinker embodiment, one cannot simply thread the line through the split in the split ring as with the FIG. 2 sinker. When any integral-ring sinker is used in the slip-sinker embodiment, a leader (not shown) can be threaded through the holes and then joined to the line. When the integral ring type of sinker is used in the drop-off sinker configuration where a loop is threaded through the rings, procedure is as before described, in the FIG. 2 configuration.

FIG. 5 shows a still further alternative 95, with openings, effectively integral rings, 97 and 98 set at an angle, e.g. 90°, to a weight element.

The configurations of FIGS. 4 and 5 are seen to be equivalent to the configuration of FIG. 2, and that any of the foregoing containing two rings or openings associated with the weight element can be used in the slip or drop off sinker embodiment.

In all of the alternatives above and in the reinforced hinge ring alternative below, the opening on the hook side of the weight provides a first opening, and the opening on the fixed end side of the weight provides a second opening.

Another type of ring can be used in combination with the sinker 20 containing the two spaced holes 25 and 26 as first described. An alternative to the split ring 29 is a reinforced hinged ring 99, shown in FIG. 5–A. This ring has two segments 101 and 102, hinged at 103, each segment being provided with suitable complementary latch-type fittings 104 and 105 at the ends of the segments, allowing the segments to be secured to close the ring. This ensures easy securing of the rings to the sinker and also facilitates the threading of the line through the rings. The latch fittings are so arranged that a locking device, suitably a screwed sleeve 106, can be secured over the joint so formed and reduce the possibility of the latch fitting opening under load. It should be noted that the latch fittings when closed with the screwed sleeve must provide a smooth, strong, close-fitting joint to ensure free running of the line without tendency to foul. The FIG. 5–A ring is equivalent to the FIG. 3 ring, and indeed, a plain piece of suitable wire bent in circular form with butting ends joined securely will serve.

In all configurations, it is seen that there are means providing at least two spaced openings associated with a weight element, the openings being adapted for passage of the line therethrough and means are provided to releasably secure the line to the sinker as aforesaid.

What we claim is:

1. A fishing sinker adapted to be releasably secured to a fishing line extending from a fixed end to a hook end thereof, release of the sinker being effected by increase in tension in a part of the line extending from the hook to the sinker, said increase in tension arising from a strike of a fish; in combination, (a) a sinker having,
  (i) a weight element,
  (ii) means providing at least two spaced openings associated with the weight element which are adapted for passage of the line therethrough, (b) a slip knot in the line in cooperative engagement with a first opening with a length of the line extending from the knot through the second opening and continuing to said fixed end of the line, said knot holding said sinker in place on the line but being releasable from the cooperative engagement with the first opening by tension produced from the strike of a fish.

2. Structure as defined in claim 1 including a second length (84.2) of the line extending from the knot (83) through the second opening, a length (84.3) back to the knot, and then a part (75) to the hook; wherein when the knot (83) is released from cooperative engagement with the first opening the weight element will drop off the line.

3. Structure as defined in claim 2, the weight element having a top edge, the openings (91, 92) being integral and formed in the weight element adjacent opposite ends of the top edge.

4. Structure as defined in claim 2, the weight element having integral openings (97, 98) set at an angle to the weight element.

5. Structure as defined in claim 2, the weight element having a top edge (28) and said openings including spaced apart rings (29, 31) secured to the weight element adjacent opposite ends of the top edge.

6. Structure as defined in claim 1 wherein when the knot is released from cooperative enagagement with the first opening the weight element will travel down the line towards toe hook.

7. Structure as defined in claim 6, the openings being integral of the weight.

8. Structure as defined in claim 7, the integral openings being set at an angle to the weight elements.

9. Structure as defined in claim 6, the weight element having a top edge, and said openings comprising spaced apart rings secured to the weight element adjacent opposite ends of the top edge.

References Cited

UNITED STATES PATENTS 2,608,017 8/1952 Hinkson ----------- 43—43.12

OTHER REFERENCES

The Ashley Book of Knots, by Clifford W. Ashley, published by Doubleday and Co., Inc., 1946, pages 87 and 308.

SAMUEL KOREN, Primary Examiner

D. J. LEACH, Assistant Examiner

U.S. Cl. X.R.

43—44.88; 289—1.5